UNITED STATES PATENT OFFICE.

JOSEPH C. HECKMAN, OF AVALON, PENNSYLVANIA, ASSIGNOR OF ONE-HALF TO WILLIAM J. GILMORE, OF PITTSBURG, PENNSYLVANIA.

PIGMENT.

No. 887,043.   Specification of Letters Patent.   Patented May 5, 1908.

Application filed September 26, 1907. Serial No. 394,649.

*To all whom it may concern:*

Be it known that I, JOSEPH C. HECKMAN, a resident of Avalon, in the county of Allegheny and State of Pennsylvania, have invented a new and useful Improvement in Pigments; and I do hereby declare the following to be a full, clear, and exact description thereof.

My invention relates to pigments.

The object of my invention is to provide a pigment of high color and brilliancy made from a waste product heretofore accounted as of no commercial value.

As the apparatus employed in the manufacture of my improved pigment is of a common form well known to those skilled in the art I have not deemed it necessary to accompany the description of my invention with drawings.

The waste product which I employ in the manufacture of my pigment is obtained from coal mines and is most commonly known as "coal mine sulfur." This product is discharged from the mines by the water which drains from the same, and finds its way usually to the neighboring creeks and streams. I collect this product by constructing a reservoir or dam in the stream where the water is held substantially in a state of rest so as to give the product an opportunity to precipitate and fall to the bottom. This precipitate in the form of a fine powder is then collected from the bottom of the reservoir. It may be obtained by other methods, such as by collecting the water from the mines in shallow pans or basins and allowing the water to evaporate, leaving the fine dust or impalpable powder. This product is yellow substance and when analyzed is found to contain silica, iron oxid and sulfuric acid combined with iron, together with slight traces of lime and magnesia. This product may be subjected to the action of heat in the form in which it is recovered and when calcined produces a good pigment, but by treating the product with the addition of sulfuric acid and then calcining the same I obtain a pigment very rich in iron oxid and of a brilliant red color, which when mixed with suitable oils, turpentine, &c., gives a paint of high color and great tinting capacity.

In manufacturing my improved pigment I may introduce into a suitable vat or reservoir one part of the coal mine sulfur, from one-fifth of one part to one part sulfuric acid and one-fifth to one part water by weight, and after thoroughly mixing the same the mixture is allowed to stand for a sufficient length of time to give the sulfuric acid sufficient time to thoroughly act on the iron and thus convert it into compounds which through subsequent stages of the process, to-wit, calcination, are readily converted into red oxid of iron. After the mixture has stood for the length of time required, say from twelve to thirty-six hours, said mixture will be in the form of a semi-fluid or pasty mass, which I then introduce into a suitable muffle or reverberatory furnace. Heat is then applied and the mass is calcined and reduced to a pulverulent form. (Where I produce the pigment from the coal mine sulfur without the addition of the sulfuric acid, the coal mine sulfur is introduced in its dry state into a suitable furnace where it is calcined. While I am able to obtain a very good pigment by calcining the coal mine sulfur in its original state, yet, as stated above, by the addition of the sulfuric acid I obtain a more brilliant color and a paint of greater tinting capacity.) The pigment so produced may then be mixed with suitable oils, turpentine, &c., to produce a paint adapted for painting iron or wood work, and may also be employed as a coloring for many other lines of manufacture.

In my invention I am enabled to make use of a waste product heretofore accounted as of no value, and obtain a pigment having a high color and as great strength as the present established standard. The product from which I manufacture my new pigment may be had for the mere cost of collecting the same.

What I claim is:

1. As a new product of manufacture, a pigment obtained by treating coal mine sulfur with a mineral acid and then calcining the same.

2. As a new article of manufacture, a pigment obtained by treating coal mine sulfur with sulfuric acid and then calcining the same.

3. As a new article of manufacture, a pigment obtained by calcining coal mine sulfur in its original state.

In testimony whereof, I the said JOSEPH C. HECKMAN have hereunto set my hand.

JOSEPH C. HECKMAN.

Witnesses:
ROBERT C. TOTTEN,
ROBT. D. TOTTEN.